(12) United States Patent
Perone (10) Patent No.: US 10,157,553 B2
(45) Date of Patent: Dec. 18, 2018

(54) BIRTH SIMULATOR FOR OPERATIVE VAGINAL DELIVERY

(71) Applicant: Nicola Perone, Houston, TX (US)

(72) Inventor: Nicola Perone, Houston, TX (US)

( * ) Notice: Subject to any disclaimer, the term of this patent is extended or adjusted under 35 U.S.C. 154(b) by 0 days.

(21) Appl. No.: 15/713,294

(22) Filed: Sep. 22, 2017

(65) Prior Publication Data

US 2018/0012514 A1 Jan. 11, 2018

Related U.S. Application Data

(63) Continuation of application No. 15/442,922, filed on Feb. 27, 2017, now abandoned, which is a continuation of application No. 15/216,184, filed on Jul. 21, 2016, now abandoned, which is a continuation-in-part of application No. 14/304,916, filed on Jun. 14, 2014, now abandoned.

(51) Int. Cl.
*G09B 23/28* (2006.01)

(52) U.S. Cl.
CPC .................. *G09B 23/281* (2013.01)

(58) Field of Classification Search
CPC ........ G09B 23/28; G09B 23/30; G09B 23/32; G09B 23/34; G09B 23/281
See application file for complete search history.

(56) References Cited

U.S. PATENT DOCUMENTS

| 9,087,456 B2* | 7/2015 | Allen ................ G09B 23/281 |
| 9,123,261 B2* | 9/2015 | Lowe ................ G09B 23/30 |
| 2015/0004583 A1* | 1/2015 | Lavigueur ............ G09B 23/281 434/267 |
| 2015/0004584 A1* | 1/2015 | Galibois ................ G09B 23/30 434/270 |

* cited by examiner

*Primary Examiner* — Bruk Gebremichael
(74) *Attorney, Agent, or Firm* — Raymond R. Ferrera; Adams and Reese LLP (57) ABSTRACT

A birth simulator assembly for simulating operative vaginal delivery, said birth simulator assembly comprising a female pelvis with a sacrum portion of the spinal column and a symphysis pubis, a fetal head adapted for rotation and linear movement through the female pelvis an electrically-powered linear actuator connected to the fetal head, a force sensor connected with fetal head, wherein the force sensor communicates to the motion controller a signal indicating a force applied to the fetal head, and a motion controller for controlling the motion of the linear actuator, wherein the motion controller is adapted for communication with a computer.

11 Claims, 6 Drawing Sheets

BIRTH SIMULATOR FOR OPERATIVE VAGINAL DELIVERY

FIELD

The present invention pertains to devices used in various medical specialties to educate, evaluate, and prepare persons for rare but serious scenarios. Specifically, but without limitation, this invention relates to a birth simulator, the purpose of which is to teach the skills needed for operative vaginal delivery, carried out either with forceps or with a vacuum extractor.

BACKGROUND

Regrettably, even though operative vaginal delivery can save the day whenever a spontaneous vaginal delivery proves difficult or impossible, and a cesarean section is either contraindicated by maternal conditions or preparation for it cannot be made in a timely fashion, the tendency, in recent years, has been, in many institutions, toward diminished resident teaching of operative vaginal delivery, particularly forceps techniques. This tendency is generally attributed to the lack of skilled instructors, resulting from the retirement of classically trained obstetricians. Consequently, the rate of forceps delivery has decreased in recent years, a trend that this simulator may help reverse. Equally, there has been some reluctance to use the vacuum because the FDA issued in 1998 a Public Health Advisory on the use of the vacuum extractor, prompted by the serious fetal hemorrhagic complications associated with it, secondary to cup detachment ("pop-offs"). The net result has been a reduced rate of operative vaginal deliveries and a parallel increase in the rate of cesarean sections.

The training of obstetricians in operative vaginal delivery, is challenging for a number of reasons, including the decreased patient's availability for teaching, the limited work hours of the residents, which makes it difficult for them to be present at unpredictable emergencies, the insufficient time that exists for discussion and analysis in such situations, and the uniqueness of each person's learning curve.

Particularly difficult has been, traditionally, when training residents in operative vaginal delivery, to teach them the following important prerequisites.

In the case of the forceps:

a) What constitutes safe traction? The trainee is generally told that the traction must be "gentle" and that for a progressive advancement of the fetal head in the birth canal, traction must be applied in a steady manner, preferably with a gradual increase in intensity, sustained for a brief interval and slowly relaxed, to simulate labor contractions. The problem here is that what constitutes "gentle" traction varies considerably from one individual to another and thus, it not unusual that undue traction be inadvertently applied, as W. H. Pearse noted over 50 years ago ("it is amazing how simple it is to sit at the end of the table and exert . . . over 100 pounds of traction"). Yet, we know from the clinical studies of W. H. Pearse and J. V. Kelly et al. that a traction force of 50 pounds (22.8 kg) should be considered the upper limit of pull with regard to fetal safety, when using forceps.

b) What is the correct line of traction? The textbooks generally emphasize that, once the fetal head has been rotated into the proper position (i.e. to the occipital-anterior position), traction must follow the curvature of the birth canal, so that the fetus progress along the path of least resistance, while, at the same time, avoiding the symphysis. The problem here is that to demonstrate, during an actual delivery, how to pull correctly, the attending has to ask the trainee to step aside and take over the instrumental delivery (for this reason teaching how to use forceps has been compared to teaching how to fly an airplane with only one set of controls).

c) How much traction is too much? Specifically, when to stop applying traction and to abandon the vaginal operative delivery in favor of a cesarean section. The trainee is generally told that the answer to that question is generally a matter of clinical judgment, acquired with experience. The problem here is that experience cannot be thought, and, as the result, the less learned, have been known to put up, on occasion, their feet against the edge of the delivery table and to pull with all their strength, as noted by J. Baxter.

In the case of the vacuum extractor:

a) What is the correct application of the cup on the fetal head? Right on the sagittal suture, with the center over the flexion point, a.k.a. the pivot point (i.e. an imaginary spot which is 2-3 cm forward of the posterior fontanelle).

b) How to apply traction perpendicular to the cup, while keeping the axis of the fetal head in line with the axis of the pelvis?

c) What is the amount of permissible traction? Specifically, the amount of traction that avoids cup detachment (a.k.a. pop-offs). As in the case of forceps, a trainee is generally told that the traction must be "gentle". Yet, we know from clinical data that the traction should be limited to the negative pressure under the cup, otherwise detachments are inevitable and with them the possibility of fetal injury. As D. Mishell et al, M. A. Duchon, and A. Vacca have shown, the amount of safe traction, with the cups currently used, at the recommended vacuum of 600 mmHg, ranges between 22 and 28 pounds, depending on the characteristics of the device used (i.e. its diameter and whether it is made of solid or elastic material).

Furthermore, the use of simulation in Obstetrics has been known and is widely accepted. A number of simulators have been invented for this purpose, such as U.S. Pat. Nos. 6,503,087 and 7,114,954, both to Eggert et al., U.S. Pat. No. 7,241,145 to Reiner et al., and U.S. Pat. No. 7,465,168 to Allen et al. None, however, has been specifically designed for operative vaginal delivery. Therefore, the simulators disclosed in the aforementioned patents can only be used to teach the correct insertion of the blades, in the case the forceps, and the proper application of the cup to the fetal head, in the case of the vacuum extractor. However, these simulators are not suited to teach the trainee the most important safety aspects of the operative vaginal delivery mentioned above, namely, what constitutes, when using forceps, "gentle" traction, what is the correct line of traction necessary to keep the head in line with the pelvic axis, and, more importantly, how much traction is too much and when using the vacuum extractor, what is the correct direction and the amount of permissible traction so that "pop-offs" can be avoided.

Thus, the need exists for a birth simulator that recognizes and addresses these limitations, allowing the trainee to reliably learn the essential aspects of operative vaginal delivery and accurately replicate the experience of a live forceps or vacuum delivery.

Embodiments usable within the scope of the present disclosure meet these needs.

SUMMARY

The present disclosure is directed to a birth simulator assembly for simulating operative vaginal delivery. The birth simulator assembly comprises a female pelvis model that can comprise a sacrum portion of the spinal column and a symphysis pubis. The birth simulator assembly further comprises a fetal head model adapted for rotation and linear movement through the female pelvis model. In an embodiment, the birth simulator assembly can comprise an electrically-powered linear actuator connected to the fetal head, a force sensor connected with fetal head, wherein the force sensor communicates to the motion controller a signal indicating a force applied to the fetal head, and a motion controller for controlling the motion of the linear actuator, wherein the motion controller can be adapted for communication with a computer. In an embodiment of the birth simulator assembly the female pelvis can be covered with a stretchable material for imitating soft tissue, wherein the stretchable material can have an opening defining a vulvar opening of the birth canal.

The birth simulator assembly can further comprise a motorized rotary indexer connected with the fetal head, wherein the rotary indexer rotates the fetal head to simulate different fetal head positions encountered in a live delivery, wherein the motorized rotary indexer is controlled by the motion controller. The birth simulator assembly can comprise a position sensor connected with the fetal head, wherein the position sensor tracks the movement of the fetal head through the pelvis for comparison with a proper line of traction through the birth canal. The birth simulator assembly can also communicate with a computer, wherein the computer can display data relating to traction applied to the fetal head. The birth simulator assembly can be set to simulate different live delivery types, wherein the birth simulator assembly can be adapted for displaying choices of different fetal head positions, wherein a fetal head position is selectable, wherein the birth simulator is further adapted for displaying choices of different stations of the head observable in a live delivery, wherein a station of the head observable in a live delivery is selectable.

The present disclosure is further directed to a method for simulating an operative vaginal delivery comprising the steps of providing a maternal portion model comprising a female pelvis, providing a fetal head connected to a linear actuator and connected to a force sensor, and providing an electronic controller for receiving a first electrical signal from the force sensor and for sending a second electrical signal to actuate the linear actuator. The method can further comprise the steps of rotating the fetal head to an occiput anterior position with forceps or a vacuum extractor, applying traction to the fetal head with the forceps or the vacuum extractor to move the fetal head through the female pelvis, sensing with the force sensor a level of force applied to the fetal head during the application of traction, and displaying the level of force on a monitor, recording the level of force on a computer, or combination thereof.

An embodiment of the method of simulating an operative vaginal delivery can further comprise the steps of providing a computer for interfacing with the electronic controller, controlling the linear actuator with the computer, the electronic controller, or combinations thereof to simulate different live delivery types, displaying on the monitor choices of different fetal head positions, selecting a fetal head position, displaying on the monitor choices of different stations of the head observable in a live delivery, and selecting a station of the head observable in a live delivery.

The foregoing is intended to give a general idea of the invention, and is not intended to fully define nor limit the invention. The invention will be more fully understood and better appreciated by reference to the following description and drawings.

BRIEF DESCRIPTION OF THE DRAWINGS

In the detailed description of various embodiments usable within the scope of the present disclosure, presented below, reference is made to the accompanying drawings, in which.

One or more embodiments are described below with reference to the listed Figures.

DETAILED DESCRIPTION OF THE EMBODIMENTS

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, order of operation, means of operation, equipment structures and location, methodology, and use of electrical or mechanical equivalents may be made without departing from the scope of the invention.

As well, it should be understood that the drawings are intended to illustrate and plainly disclose presently described embodiments to one of skill in the art, but are not intended to be manufacturing level drawings or renditions of final products, and may include simplified conceptual views as desired for easier and quicker understanding or explanation. As well, the relative size and arrangement of the components may differ from that shown and still operate within the spirit of the invention.

Moreover, it will be understood that various directions such as "upper," "lower," "top," "bottom," "left," "right," "side," and so forth are made only with respect to explanation in conjunction with the drawings, and that the components may be oriented differently, for instance, during transportation and manufacturing as well as operation. Because many varying and different embodiments may be made within the scope of the concepts herein taught, and because many modifications may be made in the embodiments described herein, it is to be understood that the details herein are to be interpreted as illustrative and non-limiting.

The present invention pertains to devices used in various medical specialties to educate, evaluate, and prepare persons for rare but serious scenarios. Specifically, but without limitation, this invention relates to a birth simulator, for teaching the skills needed for operative vaginal delivery, carried out either with forceps or with a vacuum extractor.

An embodiment of the birth simulator has the following features:

1) The trainer can select, before each simulation exercise, from a drop-down menu on the screen of a computer usable for human machine-interface (HMI), the position and the station of the head, so that the various levels of difficulty of operative vaginal delivery can be demonstrated, wherein the difficulty can depend on the station from which the delivery is initiated and the need to perform a rotation. Furthermore, once the simulation exercise starts, the trainee can be tested for the non-technical (i.e., thinking) skills, such as the ability to identify correctly the station, position of the head, and the type of operative delivery about to take place, such as mid, low, or outlet, based on the ACOG classification specified in the 2000 Practice Bulletin No. 17. The trainee can also be tested for the technical (i.e., manual) skills, such as the correct application of the forceps blades, the proper rotation and extraction.

2) The trainer can program the birth simulator before each exercise, so that the experience of a live forceps or vacuum delivery can be accurately replicated. This can be done by selecting from the two traction force drop-down menus on the computer screen, the amount of traction necessary to effect delivery or, alternatively, one of the following three possible scenarios, encountered in a live operative delivery:

a) An "easy" operative vaginal delivery, with absent or minimal resistance to the forceps or vacuum extraction and thus, effected with gentle traction. For example, with the application of traction between 1-50 pounds per each pull, if using forceps, and below the negative pressure under the cup, if using the vacuum extractor.

b) A "difficult" operative vaginal delivery (i.e., "tight fit"), with moderate resistance, requiring a traction above the safety limits, such as above 50 pounds per each pull, but below 70 pounds in the case of forceps, and above the negative pressure under the cup, in the case of the vacuum extractor, as is typically the case, in a live delivery, in the presence of borderline cephalopelvic disproportion.

c) A "failed" operative vaginal delivery, with insurmountable resistance, as it occurs, in a live delivery in the presence of unrecognized, clear-cut cephalopelvic disproportion, resulting either from the baby's head being too large to fit through the mother's pelvis or from a contracted pelvis, with lack of progress of the fetal head through the pelvis (i.e., "arrest of descend"), regardless of the amount of traction applied.

The ability to simulate the above scenarios makes the simulator uniquely useful didactically. The "easy" operative vaginal delivery can help teach the trainee what is intended with the term "gentle" traction. The "difficult" operative vaginal delivery scenario can help illustrate the situation occasionally encountered in a live delivery, in which extraction of the fetal head can be successful, but only with the application of traction above safety limits, and thus, to be avoided, being highly likely to be associated with maternal complications and fetal injury. Furthermore, this scenario allows the trainer to make the point that the decision to continue with operative vaginal delivery must be re-evaluated continuously during each step of the delivery. The simulator can alert the trainee when the upper limit of safety is reached, while still leaving open the option "to apply one more pull", as often obstetricians are tempted to do in a live delivery, in similar circumstances. Lastly, the "failed" operative vaginal delivery scenario can help stress the important principle that every forceps or vacuum extractor delivery must be approached as a "trial" forceps/vacuum extractor delivery, (i.e., ready to abandon the operative delivery attempt, if the upper limit of safety is being reached and no progress in the fetal descent through the pelvis is apparent). Although with the traditional instruments, when to abandon operative vaginal delivery and resort to a cesarean section, is left entirely to the doctor's judgment, acquired through years of experience, the technology now exists to give forceps and vacuum extractors the ability to measure traction and to alert the doctor whenever preset safety limits are being exceeded. Thus, the capability of the birth simulator to tell the trainee when to stop pulling renders it useful not just to simulate deliveries carried with the traditional instruments, but also with the modernized ones, once these are introduced into clinical practice.

3) During a birth simulation exercise, the trainee can see, in real time, on the screen of the computer, a graphic display of the traction, which we have called the operative delivery graph.

4) The trainee can see a graphic animation of the line of traction of the fetal head along within the birth canal and of the rotation of the head, with the resulting occiput anterior (OA) position, both of which have the purpose to provide feedback to the trainee. The graphic animations, as well as the operative delivery graph, can be recorded and reviewed with the trainee during the debriefing period, for example, in a manner similar to how a golf professional reviews swing mechanics with a student.

The foregoing is a broad outline of the features and technical advantages of an embodiment of the birth simulator so that the detailed description of the invention may be better understood. Additional features and advantages of the birth simulator will be described hereafter. It should be appreciated by those skilled in the art that the conception and the specific embodiments disclosed may be readily used as a basis for modifying or designing other birth simulators for carrying out the same purpose of the presently described birth simulator. It should be understood by those skilled in the art that such equivalent construction and/or function do not depart from the spirit and scope of the invention as set forth.

Figure 1:
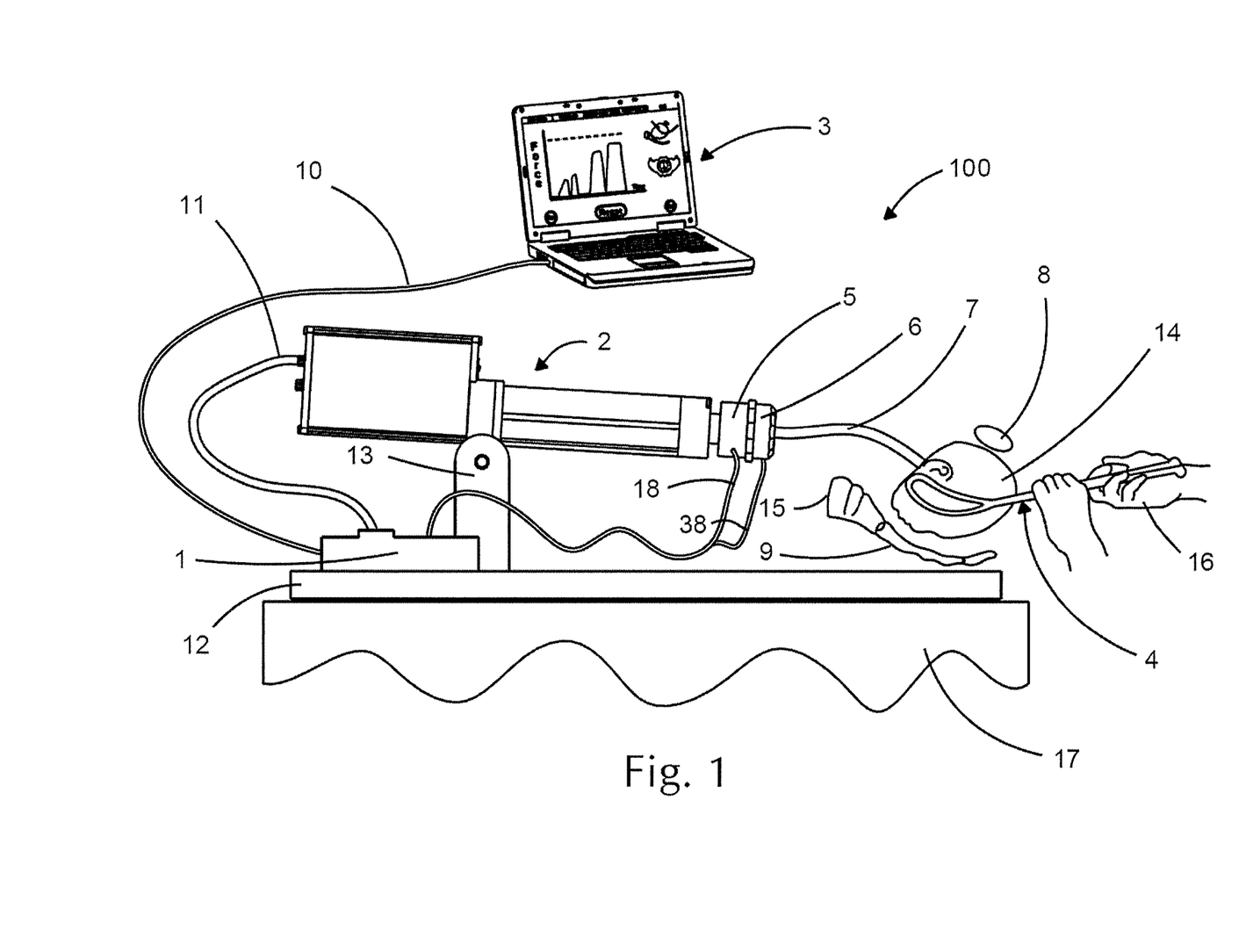
FIG. 1 depicts a cross-sectional side view of an embodiment of a birth during a simulated forceps delivery exercise.

Turning now to FIG. 1, there is shown a side view of an embodiment of a birth simulator (100), arranged on a base or a support (12), resting on a tabletop or desk (17). The birth simulator (100) is shown comprising a fetal portion model comprising a term-size fetal head (14) model with a neck analog (7) made of a steel cable, or another flexible rod or elongated member. The birth simulator (100) further comprises a maternal portion comprising an anatomically correct female pelvis (15) model and other maternal anatomy described herein. See also FIG. 6a for a front view of the pelvis (15) model. The birth simulator (100) further comprises a motion controller (1) and an electrically powered linear actuator (2) connected to the fetal head (14) and pivotally mounted to the support (12) by support bracket (13) to allow free and unbound movement as the fetus head (14) advances through the pelvis (15). FIG. 1 further depicts the birth simulator (100) comprising a force sensor (5), a motorized rotary head indexer (6), and a computer (3) for human machine-interface, which is loaded with a software written for its functional requirements, which are described below. Forceps (4) are shown applied to the fetal head (14), with the proper hand position (16), to allow traction to be exerted downward and outward, as recommended.

Figure 3A:
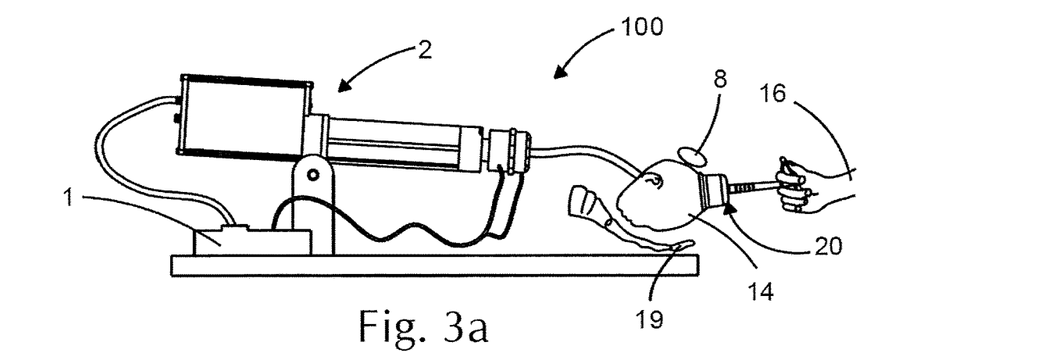
FIG. 3a depicts a cross-sectional side view of an embodiment of a birth simulator at the beginning of a simulated vacuum extractor delivery exercise.
Figure 6A:
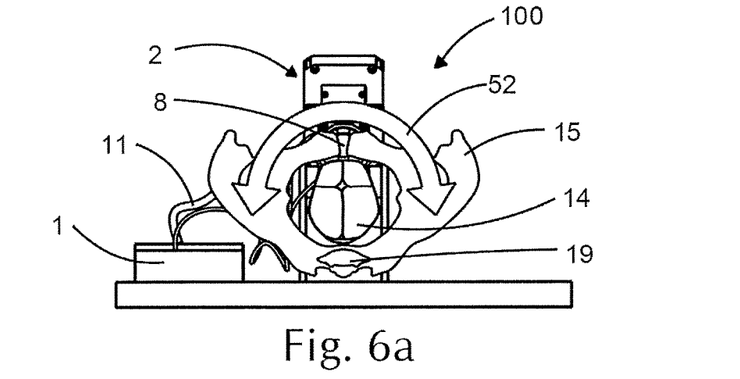
FIG. 6a depicts a front view of an embodiment of a birth simulator.
Figure 6B:
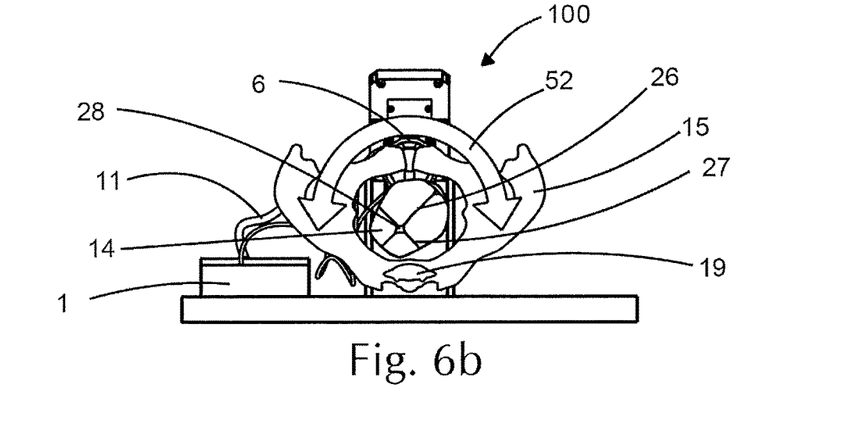
FIG. 6b depicts another front view of an embodiment of a birth simulator.

Referring still to FIG. 1, the fetal head (14) model, located inside pelvis (15), has the outmost layer made of contoured rubber (not shown), with fontanelle (28) and cranial sutures (26), both shown in FIG. 6b, to allow the diagnosis of position, necessary for the correct application and traction of forceps (4) or vacuum extractor (20), shown in FIG. 3a. The fetal head (14) has a neck analog (7), through which it is connected to the linear actuator (2) in order to be able to follow the angulated birth canal during the simulated operative delivery. The steel cable neck analog is flexible, but resists torsional movement or twisting. The female pelvis (15) is anatomically correct, comprising the sacrum portion of the spinal column (9) and the symphysis pubis (8), to allow teaching the trainee the correct line of traction, which can be along the J-shaped axis of the pelvis (15), which is the path of least resistance. The pelvis (15) also can have internal landmarks, including the ischial spines (not shown), which allow teaching the trainee how to reliably diagnose the station of the fetal head (14) (i.e. whether it is above, between, and below them). The pelvis (15) and the perineum (not shown) can be covered with stretchable material (not shown) for imitating soft tissue and/or skin of the female anatomy and for simulating a realistic feel of human skin. The stretchable material can have an opening defining a vulvar opening of the birth canal, while the birth canal can also be covered with stretchable material (not shown), to give the trainee the feel of the soft tissue of the female anatomy. In another embodiment (not shown) of the birth simulator (100), legs can be attached to the pelvis (15), wherein the legs can also covered with silicone skin, silicone skin (not shown), The motion controller (1) (such as Model RMC 75, available from Delta Computer Systems, Biloxi, Miss.), is connected through the actuator signal cable (11) to the linear actuator (2), which is used to move the fetal head (14) through the birth canal. The motion controller (1) is also connected to a motorized force sensor (5), which is used to sense the force of traction and to modulate the linear actuator (2). Moreover, the motion controller (1) is connected to a motorized head indexer (6), which is used to rotate the fetal head (14) into any of the eight positions (i.e. OA, ROA, LOA, ROT, LOT, ROP, LOP and OP), encountered in a live delivery. Furthermore, the motion controller (1) can receive signals from a six axis position sensor (not shown), located within the fetal head (14) model. Lastly, the motion controller (1) is depicted connected to the computer (3). Although the motion controller (1) is located externally from the computer (3), in other embodiments (not shown) of the birth simulator (100), the controller may be positioned within the computer (3), whereby the individual sensors and actuators can be connected to a wired or a wireless communications node usable to communicate with the internal controller.

Figure 2A:
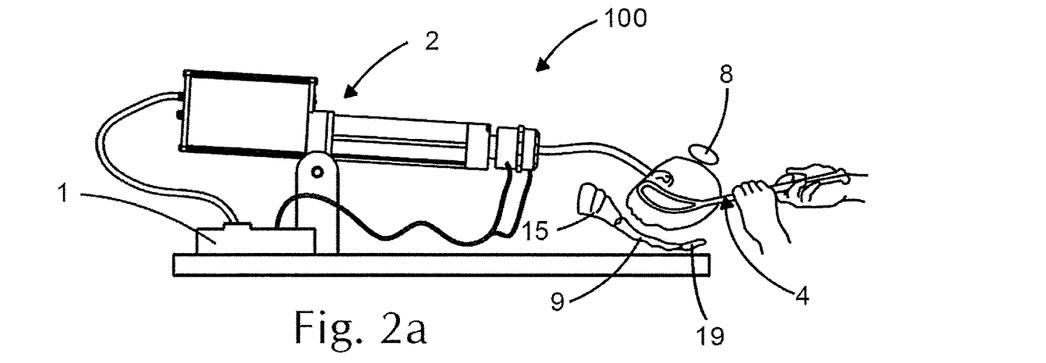
FIG. 2a depicts a cross-sectional side view of an embodiment of a birth simulator at the beginning of a simulated forceps delivery exercise.
Figure 2B:
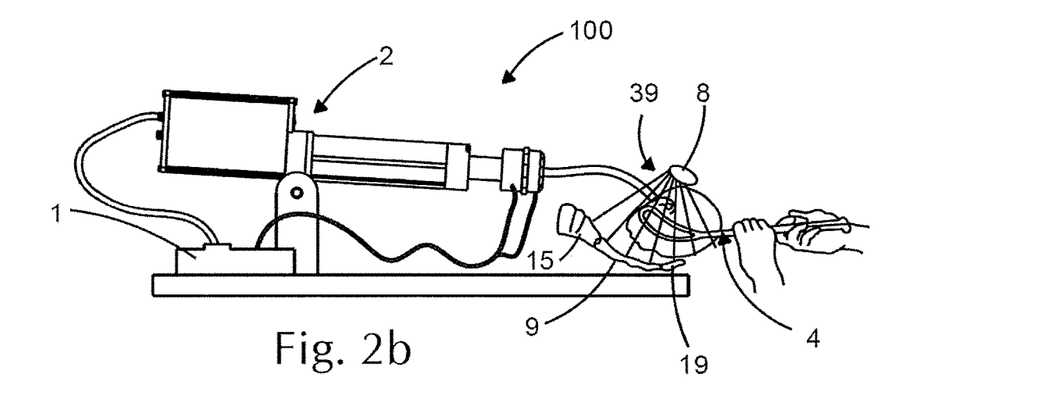
FIG. 2b depicts another cross-sectional side view of an embodiment of a birth simulator during a simulated forceps delivery exercise, with the fetal head advancing through the different planes of the pelvis.
Figure 2C:
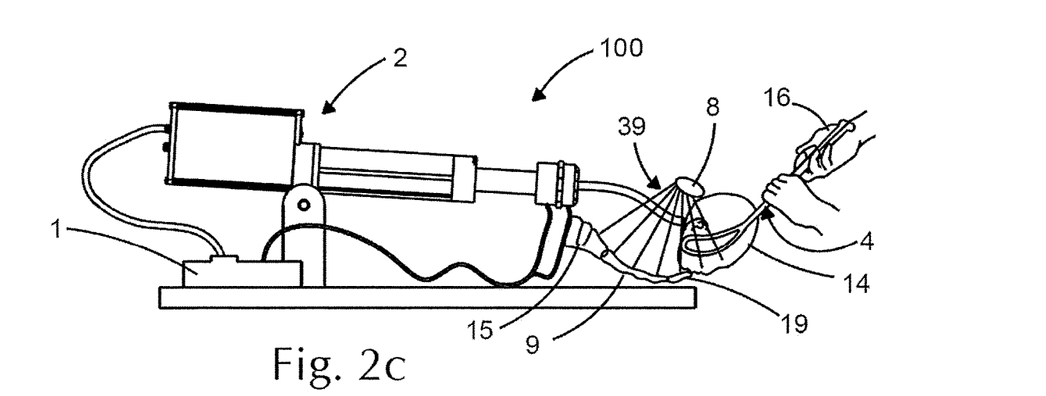
FIG. 2c depicts another cross-sectional side view of an embodiment of a birth simulator during a simulated forceps delivery exercise, with the fetal head (occiput) past the symphysis.

FIGS. 2a, 2b, and 2c show a simulated operative delivery carried out with forceps (4), with the fetal head model (14) between the symphysis (8) anteriorly and the coccyx (19) posteriorly. The figures illustrate a classical Simpson type model forceps (4), with separated shanks.

Figure 3B:
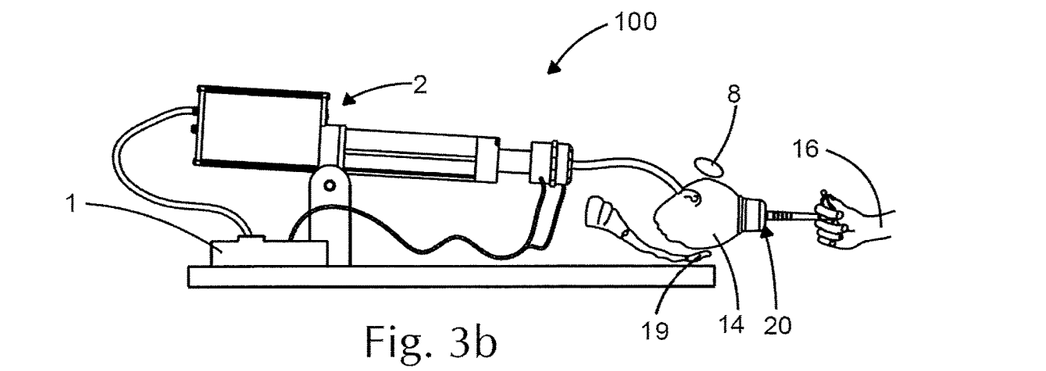
FIG. 3b depicts another cross-sectional side view of an embodiment of a birth simulator during a simulated vacuum extractor delivery exercise, with the fetal head (occiput) below the symphysis.
Figure 3C:
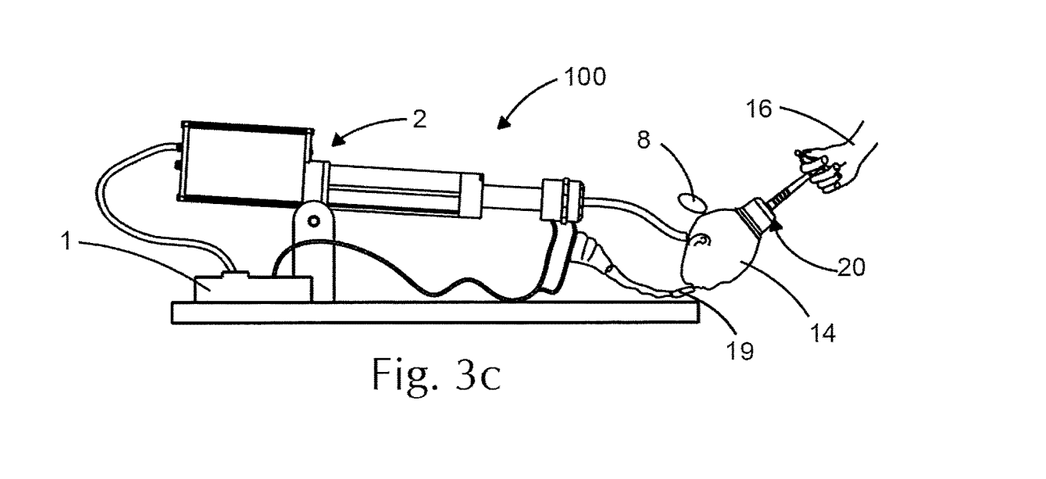
FIG. 3c depicts another cross-sectional side view of an embodiment of a birth simulator during a simulated vacuum extractor delivery exercise, with the fetal head (occiput) past the symphysis.

FIGS. 3a, 3b, and 3c depicts a simulated operative delivery similar to the operative delivery shown in FIGS. 2a, 2b, and 2c, except that the operative delivery is being carried out with a vacuum extractor (20).

Figure 4:
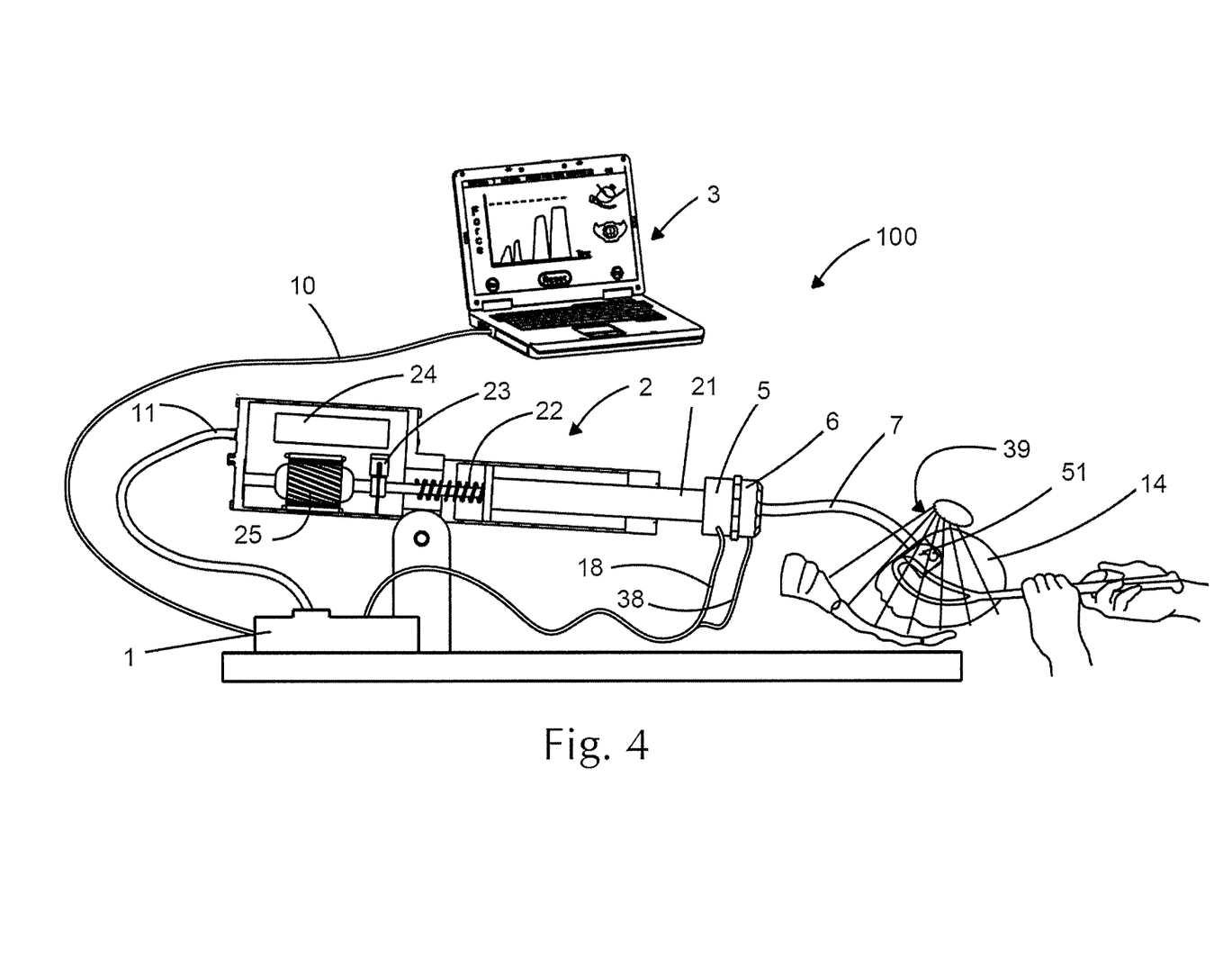
FIG. 4 depicts a cross-sectional side view of an embodiment of a birth simulator during a simulated forceps delivery exercise, showing a cross-sectional view of the linear actuator.
Figure 5:
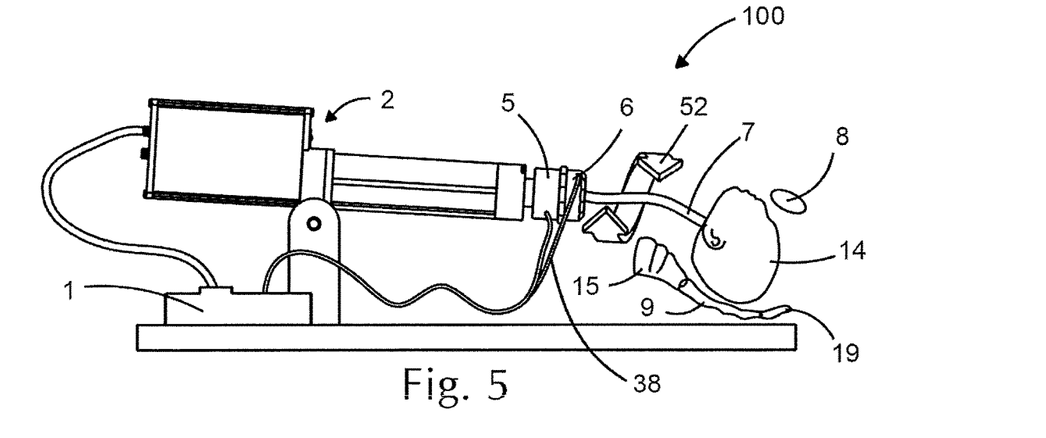
FIG. 5 depicts a cross-sectional side view of an embodiment of a birth simulator, showing the rotation of the head indexer.
Figure 8:
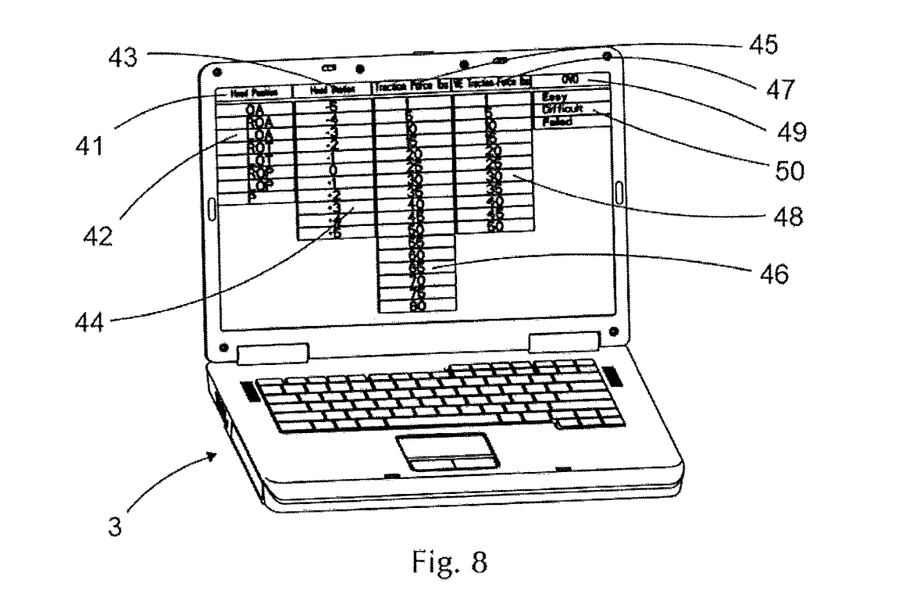
FIG. 8 depicts a computer with another embodiment of the human machine-interface on the screen.

FIG. 4 shows the birth simulator (100) with a cross-section view of the electrically powered linear actuator (2) and its internal components. One such component is the actuator driven rod (21), with a force sensor (5) attached thereto, wherein the force sensor (5) produces an electrical force feedback signal that is proportional to the traction force applied to the fetus head (14). Another component is the amplifier (24), which amplifies the electric signals it receives from the controller (1), to a level sufficient to power the actuator motor (25). Once activated, the actuator motor (25) rotates the actuator driver screw (22) and, through the conversion of the rotary motion into a linear motion, translates the actuator driven rod (21) in and out of the linear actuator (2) with a velocity that is proportional to the output signal. The encoder (23) measures the angular position of the actuator driver screw (22), to source a positional feedback signal of the actuator driven rod (21) to the motion controller (1). Depicted adjacent to the force sensor (5) is the motorized head indexer (6). In addition, FIG. 4 shows, the fetal head (14) with the six axis position sensor (51), as it advances through the pelvic stations (39);

FIG. 5 shows the rotation (52) of the head indexer (6) within the birth canal, with the symphysis positioned (8) anteriorly and the coccyx (19) positioned posteriorly. The motorized head indexer (6) can be activated by the trainer, before each simulation exercise, with the selection of any of the eight possible positions of the head from the drop-down menu on the screen of the computer (3). A dropdown menu shown in FIG. 8 depicts the eight head positions (41, 42). Alternatively, the motorized head indexer (6) can be activated by the trainee, during the simulation exercises, with the rotation of the head to the OA position. It is known in the art that in operative vaginal delivery the head is rotated to the OA position, from whatever position it happens to be before the application of traction with forceps or vacuum extractor.

FIG. 6a shows a front view of the birth simulator head (14) model with the rotation (52) in an occiput posterior position (OP), in relation to the symphysis (8) and the coccyx (19).

FIG. 6b shows the front view of the birth simulator (14) model with the rotation (52) of the fetal head (14) model in a left occiput anterior position (LOA). The Figure also shows the sagittal suture (26), the coronal suture (27), and the anterior fontanelle (28).

Figure 7:
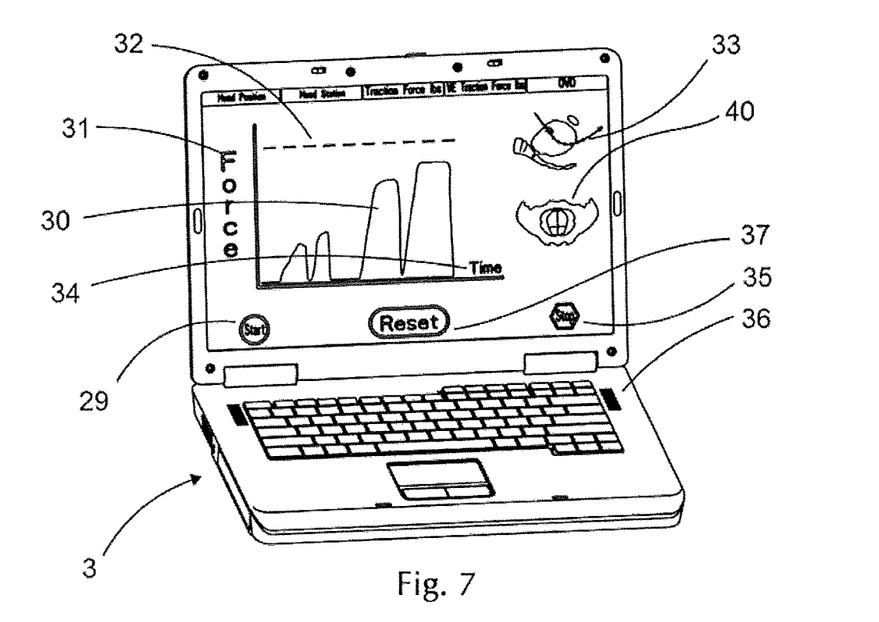
FIG. 7 depicts a computer with an embodiment of the human machine-interface on the screen.

FIG. 7 shows the screen of the computer (3) for human machine-interface, with a graphic display of the traction (30, 31, 32, 34), referred to as the "operative delivery graph," a graphic animation of the line of traction of the fetal head along the axis of the birth canal (33), and a graphic display of the rotation of the head (40), with the resulting OA position. These visual displays can be used to provide feedback to the trainee.

Output signals generated by the force sensor (5) can be used to generate the operative delivery graph (30, 31, 32, 34) depicted in FIG. 7. Referring also to FIG. 4, the traction applied to the fetal head (14) with forceps (4) or with the vacuum extractor (16), is measured and converted into an electrical signal, typically in the order of few millivolt, proportional to the amount of force applied, by the force sensor (5), which can comprise load cells (not shown). Such signal is routed through the load cells signal cable (18), to the motion controller (1), as the initial components of the closed loop Proportional, Integral, Derivative (PID) motion control process. The resultant product is an output signal relayed through a cable (10) to the computer (3) for human machine-interface. After undergoing analog digital conversion, the output signal is displayed as a graph, with the force of traction shown in pounds or other units on the ordinate (31), the time in seconds on the abscissa (34), and with a dotted line (32), indicating the upper limit of normal force.

The output signals generated by the position sensor (51) can be used to generate the graphic animation of the line of traction (33) depicted in FIG. 7. Referring also to FIG. 4, the six axis position sensor (51), located on the fetal head (14), tracks the advancement of the fetal head (14) in a three dimensional space of the pelvis (15) and generates electrical signals regarding such movement of the fetal head (14). These electrical signals are communicated, by wire or through a wireless radio transmitter (not shown), to the motion controller (1) and relayed to the computer (3). The computer (3), in turn, generates a graphic animation (33, see FIG. 7) of the line of traction (33) in real-time, which can be used by the trainee to judge if traction is being appropriately applied along the axis of the pelvis (15) (i.e. along the path of least resistance).

The output signals generated by the head indexer (6) can be used to generated the graphic animation of the rotation of the head (40) further depicted in FIG. 7. Referring also to FIGS. 5, 6a, and 6b, the rotation of the head (14), shown by arrow (52), is measured by the motorized head indexer (6) and converted into an electrical signal, which is then communicated to the motion controller (1) through the indexer signal cable (38). The signal is then communicated through the Ethernet cable (10), to the computer (3), for human machine-interface, wherein the graphic animation of the rotation of the head (40) is generated from such data, to allow the trainee to verify, before applying traction, that the head (14) is indeed in the required OA position. In an embodiment (not shown) of the birth simulator (100), the position of the head (100) can also be displayed, as rotation takes place, by calibrated markings on the circumference of the indexer (6) body.

Further depicted in FIG. 7 is an annunciator (36), the purpose of which is to sound an alert whenever the upper limit of safe traction is exceeded during a simulation exercise, wherein the upper limit can be 50 pounds per pull when using the forceps (4), and above the break away negative pressure under the cup, when using the vacuum extractor (20). In an embodiment (not shown) of the birth simulator (100), the computer (3) can be programmed to emit a voice alert, indicating the level of traction progressively reached during the simulated delivery (e.g., "Attention. Traction has reached 30 pounds", etc.), upon approaching 50 pounds (22.68 kg) of traction with forceps (4), and to indicate the negative pressure under the cup of the vacuum extractor (20), a voice alert, asking to desist from further extractive efforts (e.g., "Stop. Traction approaching the 50 pounds safety limit", etc.).

In addition, FIG. 7 shows on the computer screen the start (29), stop (35) and reset icons (37). The purpose of the reset icon (37) is to retract the fetal head (14) into the pelvis (15) at the end of each simulation exercise, so that the simulator (100) can be readied for a new exercise. The selection of the resect icon (37) on the screen of the computer (3), generates an electronic signal, which reaches the motion controller (1). The motion controller (1) then routes the electronic signal through the actuator signal cable (11) to the linear actuator (2), wherein after being amplified by the amplifier (24), the electronic signal activates the motor (25) to rotate in a counterclockwise direction the actuator driver screw (22).

Referring now to FIG. 8, which depicts the screen of the computer (3) displaying a plurality of drop-down menus (42, 44, 46, 48, 50), which allow the trainer to program the birth simulator (100) before each exercise, so that the experience of a live forceps or vacuum delivery can be accurately replicated.

The computer software for the drop-down menu can be written to allow:

a) The selection, from the appropriate drop-down menu, of any of the eight possible positions of the fetal head (41, 42), namely the OA, ROA, LOA, ROT, LOT, ROP, LOP and OP positions, as shown in FIG. 8. In particular, the selection, of a given position (42) from the screen of the computer (3), generates an electronic signal, which reaches the motion controller (1) through the Ethernet cable (10). The motion controller (1) can then send, through the indexer signal cable (38), the signal to the motorized head indexer (6), which can rotate the fetal head (14) to the desired position.

b) The selection of any of the eleven stations of the head observable in a live delivery (43, 44), shown in FIG. 8, from −5 to +5 centimeters, relative to the ischial spines (not shown), with −5 indicating the station of the head (14) at the inlet, 0 at the level of the spines, +2, +3 at low station, and +4, +5 at the outlet. Some of the stations (44) that the trainer can select, are for teaching purposes, namely, to test the diagnostic ability of the trainee, since in modern obstetrics, forceps (4) or vacuum extractors (20) are most often applied at low stations (+2, +3) or at the outlet (+4, +5), when the head visible at the perineum. The forceps (4) or the vacuum extractor (20) are often removed after the posterior fontanelle has passed beyond the subpubic angle, formed by the conjunction of the two pubic bones at the symphysis pubis (8), and the head has been extended with an upward-downward direction.

The selection of a particular station (43, 44) from the screen of the computer (3) generates an electronic signal, which reaches the motion controller (1). The motion controller (1) can then send, through the actuator signal cable (11), a signal to the linear actuator (2), which, after going through the amplifier (24), activates the motor (25) to rotate in a clockwise or counterclockwise direction, depending on the need to move forward or backward the fetal head (14) from its present position. Furthermore, the signal from the motion controller activates the encoder (23, see FIG. 4), located inside the linear actuator (2), wherein the encoder keep track of the location of the head (14) along the longitudinal axis of the birth canal and to tell the motor (25) to stop, once the selected station is reached.

c) The selection of the amount of traction force necessary to effect the simulated operative delivery, either directly from the traction drop-down menus (45, 46, 47, 48), or indirectly from the operative vaginal delivery (OVD) drop-down menu (49, 50), with the option of the three possible scenarios encountered in a live operative delivery, namely easy, difficult, or failed operative vaginal delivery. For instance, in the case of a forceps delivery simulation, the selection by the trainer, from the drop-down menus (45, 46) on the screen of the computer (3), of a 30-pound traction per pull, can send a signal to the motion controller (1) to set a 30-pound threshold to activate the motor (25) inside the linear actuator (2). Accordingly, the motor can begin rotating clockwise, allowing the fetal head (14) to move downward inside the pelvis (15), only when the selected 30 pounds of traction is applied.

Similarly, the selection by the trainer of the "easy" operative vaginal delivery scenario, from the OVD drop-down menu (49-50), can send a signal to the motion controller (1) to set a 1-50 pound range as the threshold (i.e., the amount considered "gentle" traction) to activate the motor (25) inside the linear actuator (2). On the other hand, the selection of a "difficult" operative vaginal operative delivery scenario from the OVD drop-down menu (49-50), can send a signal to the motion controller (1) to set a traction threshold above the safety limits (i.e., greater than 50 pounds, but less than 70 pounds) to activate the motor (25), which can trigger the alarm and cause, in the case of the vacuum extractor, its detachment from the fetal head (14). In contrast, the selection of a "failed" operative vaginal delivery scenario can send a signal to the motion controller (1) not to activate the motor (25), regardless of the amount of traction applied.

Although the present invention and its advantages been described in detail, it should be understood that various changes, substitutions, and alterations could be made herein without departing from the spirit and scope of the invention as defined by the appended claims. Furthermore, while various embodiments usable within the scope of the present disclosure have been described with emphasis, it should be understood that within the scope of the appended claims, the present invention can be practiced other than as specifically described herein.

It should further be understood by persons of ordinary skill in the art that an embodiment of the birth simulator (100), in accordance with the present disclosure, can comprise all of the elements, features, or method steps described above. However, it should also be understood that each element, feature, or method described above can be omitted or incorporated into the birth simulator (100), by itself or in combinations, without departing from the scope of the present disclosure.

What is claimed is:

1. A birth simulator assembly for simulating an operative vaginal delivery, said birth simulator assembly comprising:
    a maternal portion model, comprising:
        a female pelvis model having a sacrum portion model of a spinal column model and a symphysis pubis model defining a downwardly and upwardly extending portion of a birth canal model; and
    a fetal portion model, comprising:
        a term-size fetal head model horizontally and vertically translatable and rotatable,
        wherein the fetal head model translates downwardly and upwardly as the fetal head model moves through the birth canal model around the symphysis pubis model;
        a neck analog connected to the fetal head model; and
        a linear actuator having an actuator rod, an actuator driver screw, and a motorized head indexer connected to the neck analog, wherein the linear actuator rod moves the fetal head model through the birth canal model by translating a rotary motion of the actuator driver screw into a linear motion; and
    a force sensor connected with the fetal portion model, wherein the force sensor generates an electrical signal indicative of a traction force applied to the fetal head model with forceps or vacuum extractor, wherein the linear actuator prevents the fetal head model from moving along the birth canal model until the traction force applied to the fetal head model is greater than a threshold traction force, wherein the birth simulator assembly is operable to receive a value for the threshold traction force before a simulation of the operative vaginal delivery, wherein the birth simulator assembly is further operable to generate a first visual or audio output indicative of the traction applied to the fetal head model with the forceps or vacuum extractor to teach a trainee to recognize different levels of traction force during a live operative vaginal delivery, and wherein the birth simulator assembly is further operable to generate a second visual or audio output when the traction force applied to the fetal head model with the forceps or vacuum extractor reaches a traction force safety limit to teach the trainee to recognize the traction force safety limit above which likelihood of birth complications and/or injury to mother and/or fetus during the live operative vaginal delivery is unacceptably high.

2. The birth simulator assembly of claim 1, wherein the signal is proportional to the traction force applied to the fetal head model, and wherein the linear actuator moves the fetal head model through the birth canal model with a velocity that is proportional to the signal generated by the force sensor when the traction force applied to the fetal head model is greater than the threshold traction force.

3. The birth simulator assembly of claim 1, wherein the birth simulator assembly is operable to receive a value for the traction force safety limit before the simulation of the operative vaginal delivery.

4. A birth simulator assembly for simulating an operative vaginal delivery, said birth simulator assembly comprising:
    a female pelvis model;
    a fetal head model operable for rotation and translation through the female pelvis model;
    a linear actuator having an actuator rod, an actuator driver screw, and a motorized head indexer connected to the fetal head model;
    a rotational actuator connected to the fetal head model;
    a motion controller for controlling the motion of the linear actuator and the rotational actuator, wherein the motion controller causes the actuator rod of the linear actuator to translate the fetal head model to a selected linear position along the female pelvis model by translating a rotary motion of the actuator driver screw into a linear motion, wherein the motion controller causes the rotational actuator to rotate the fetal head model to a selected rotational position within the female pelvis model, and wherein the birth simulator assembly is operable to receive the selected linear position and the selected rotational position before a simulation of the operative vaginal delivery; and
    a force sensor operable to generate a signal related to a traction force applied to the fetal head model, wherein the signal is communicated to the motion controller, wherein the motion controller further causes the linear actuator to hold the fetal head model in the selected linear position along the female pelvis model when the traction force is applied to the fetal head model until the traction force applied to the fetal head model is greater than a threshold traction force, and wherein the birth simulator assembly is operable to receive a value for the threshold traction force before the simulation of the operative vaginal delivery.

5. The birth simulator assembly of claim 4, wherein the birth simulator assembly is further operable to generate a visual or audio output when the traction force applied to the fetal head model during the simulation of the operative vaginal delivery reaches a traction force safety limit to teach a trainee what the traction force applied to the human fetus feels like when the traction force reaches a traction force safety limit above which likelihood of birth complications and/or injury to mother and/or the human fetus during a live operative vaginal delivery is unacceptably high and at which time to abandon the live operative vaginal delivery and perform a cesarean section.

6. The birth simulator assembly of claim 5, wherein the visual or audio output is a first visual or audio output, wherein the birth simulator assembly is further operable to generate a second visual or audio output that indicates a level of traction force progressively applied to the fetal head model during the simulation of the operative vaginal delivery to teach the trainee what different levels of traction force within the traction force safety limit feel like when applying traction force to the human fetus during the live operative vaginal delivery.

7. The birth simulator assembly of claim 5, wherein the motion controller is further operable to cause the linear actuator to prevent the fetal head model from moving along the female pelvis model when the traction force applied to the fetal head model during the simulation of the operative vaginal delivery is above the traction force safety limit to simulate an arrest of descent of the human fetus during a failed live operative vaginal delivery.

8. A method for simulating an operative vaginal delivery using a simulator comprising a fetal head model and a female pelvis model, the method comprising:
    entering to the simulator a value for an initial station of the head to cause a linear actuator having a linear actuator rod, an actuator driver screw, and a motorized head indexer to move the fetal head model along the female pelvis model to the initial station of the head;
    entering to the simulator a value for a threshold traction to cause the linear actuator to hold the fetal head model at the initial station of the head until an amount of traction applied to the fetal head model is greater than the threshold traction;
    applying forceps or a vacuum extractor to the fetal head model while the fetal head model is disposed within the female pelvis model at the initial station of the head;
    rotating the fetal head model to an occiput anterior position with the forceps or the vacuum extractor; and
    applying traction to the fetal head model with the forceps or the vacuum extractor to:
        cause a force sensor to generate an electrical signal indicative of the amount of traction applied to the fetal head model;
        cause the actuator rod of the linear actuator to push the fetal head model through the female pelvis model by translating a rotary motion of the actuator driver screw into a linear motion when the amount of traction applied to the fetal head model is greater than the threshold traction; and
        cause the simulator to generate a visual or audio output when the amount of traction applied to the fetal head model reaches a traction safety limit to teach a trainee to recognize when the amount of traction force applied to a human fetus during a live operative vaginal delivery reaches the traction safety limit above which likelihood of birth complications and/or injury to mother and/or the human fetus during the live operative vaginal delivery is unacceptably high and to abandon the live operative vaginal delivery and perform a cesarean section.

9. The method of claim 8, further comprising before rotating the fetal head model with the forceps or the vacuum extractor, entering to the simulator a value for an initial rotational position of the fetal head model within the female pelvis model to cause a rotary actuator to rotate the fetal head model to the initial rotational position of the fetal head model within the female pelvis model.

10. The method of claim 8, further comprising entering to the simulator a value for the traction force safety limit.

11. The method of claim 8, wherein the visual or audio output is a first visual or audio output, wherein the method further comprises applying traction to the fetal head model with the forceps or the vacuum extractor to cause the simulator to generate a second visual or audio output indicative of the amount of traction being applied to the fetal head model to teach the trainee to recognize what amount of traction force is being applied to the human fetus during the live operative vaginal delivery.

* * * * *